United States Patent

Ono et al.

[11] Patent Number: 5,612,433
[45] Date of Patent: Mar. 18, 1997

[54] AGENT FOR WATER-REPELLENT TREATMENT OF FIBERS

[75] Inventors: Ichiro Ono; Kenichi Isobe, both of Annaka; Hironori Tsukada, Sakai; Kenji Ueji, Kawachinagano; Masakazu Komemushi, Hirakata, all of Japan

[73] Assignees: Shin-Etsu Chemical Co., Ltd., Tokyo; Konishi Co., Ltd., Osaka-fu, both of Japan

[21] Appl. No.: 557,515

[22] Filed: Nov. 14, 1995

Related U.S. Application Data

[63] Continuation of Ser. No. 269,276, Jun. 30, 1994, abandoned.

[30] Foreign Application Priority Data

Jun. 30, 1993 [JP] Japan .................................... 5-183423
Jun. 24, 1994 [JP] Japan .................................... 6-166297

[51] Int. Cl.$^6$ ...................... C08F 230/08; C08F 220/10; C08F 220/22; C08F 224/00; B32B 27/12
[52] U.S. Cl. ...................... 526/279; 526/328.5; 526/245; 526/273; 442/81
[58] Field of Search ................ 526/279, 328.5, 526/245, 273; 428/266

[56] References Cited

U.S. PATENT DOCUMENTS

| | | |
|---|---|---|
| 4,153,640 | 5/1979 | Deiner et al. . |
| 4,464,506 | 8/1984 | Alberts et al. . |
| 4,985,155 | 1/1991 | Yamada et al. . |
| 5,066,521 | 11/1991 | Morsy . |
| 5,229,435 | 7/1993 | Sakai et al. ............................. 523/105 |
| 5,256,739 | 10/1993 | Ono et al. . |
| 5,258,458 | 11/1993 | Allewaert et al. . |
| 5,288,827 | 2/1994 | Li et al. .................................. 526/279 |
| 5,476,912 | 12/1995 | Hosoi et al. ............................ 526/279 |

FOREIGN PATENT DOCUMENTS 2596078   9/1987   France .

OTHER PUBLICATIONS

Patent Abstracts of JP 1,239,175.

Primary Examiner—Joseph L. Schofer
Assistant Examiner—Wu C. Cheng
Attorney, Agent, or Firm—Millen, White, Zelano, & Branigan, P.C.

[57] ABSTRACT

Disclosed is a water repellent for fibers, comprising an acryl-silicone graft copolymer which is prepared by a radical copolymerization reaction of an organopolysiloxane compound containing one radical polymerizable group with radical polymerizable monomers including an acrylate, a methacrylate or a mixture thereof as a main member.

18 Claims, No Drawings

AGENT FOR WATER-REPELLENT TREATMENT OF FIBERS

This application is a continuation of application Ser. No. 08/269,276, filed Jun. 30, 1994, now abandoned.

FIELD OF THE INVENTION

The present invention relates to an agent for fiber treatment and, more particularly, to an agent for water-repellent treatment of fibers (which is abbreviated to a water repellent, hereinafter) which can impart highly durable water repellency to fibers and the like under a simple process of treatment without exerting any bad influence on the environment.

BACKGROUND OF THE INVENTION

As for the method of giving water repellency to natural or synthetic fibers, there has so far been known methods of treating the fibers with silicone compounds capable of functioning as water repellent. In such a method, fibers are treated under high temperature.

Therefore, that method has a disadvantage in being subject to restrictions on the species of fiber to which it is applicable. In addition, it has defects in that it has low producibility because it requires a long treatment time and in that the water repellency is insufficient in durability.

For the purpose of diminishing such defects, there have been submitted such proposals as to apply heat to certain silicone compounds to cause cross-linking reaction therein, thereby enabling them to produce water repellency and durability (Japanese Tokko Sho Nos. 51-9440, 51-27465 and 53-4158). However, those proposals fail to ensure satisfactory water repellency and durability if the treatment is deficient in temperature and time, and so they are still insufficient for the purpose.

On the other hand, it has also been known that fluorine-containing polymers, including homopolymers of polymerizable monomers containing perfluoro or fluoroalkyl groups in their individual molecules and copolymers of said monomers and other polymerizable monomers, can produce an excellent water-repellent effect, and an antisoiling effect also, upon textile fabrics and the like even when they are used in a relatively small amount. Also, these polymers have been utilized as surface finishing agent in the fields of the leather processing industry, the manufacture of building materials and so on.

In giving water repellency or the like to textile goods, leather, building materials and so on, it is most convenient for ordinary consumers to use an agent for such a treatment in the form of aerosol spray.

In order to efficiently provide materials as cited above with water repellency by the spraying operation of an aerosol, however, various restrictions are placed on the water repellent composition.

More specifically, it is required of the composition to satisfy the following necessary conditions:

(1) a jet gas for the aerosol has high compatibility with and a good chemical affinity for a raw solution to be compounded therewith, (2) a water repellent is homogeneously dissolved in the composition, (3) when the composition is sprayed onto a material to be treated therewith, it can readily wet the surface of the material and moderately permeate thereinto, and so on.

Only when these conditions are fulfilled can the aerosol be uniformly sprayed and provide excellent water-repelling and antisoiling properties without causing a powder-coated, napping, whitening or another undesirable phenomenon.

Moreover, it is important to ordinary consumers that the water repellent composition is high in safety and free from unpleasant odor. These points are of concern as to the organic solvent incorporated in the water repellent composition.

The foregoing known fluorine-containing polymers are insoluble in alcohols of lower toxicity, such as ethanol. If the solvent is chosen from the standpoint of solubility, therefore, it can be found in the group of ketones such as acetone, methyl ethyl ketone, etc., the group of esters such as ethyl acetate, etc., the group of aliphatic hydrocarbons such as n-hexane, n-heptane, etc., the group of aromatic hydrocarbons such as toluene, xylene, etc., and the group of chlorinated hydrocarbons such as 1,1,1-trichloroethane, trichloroethylene, etc.

However, most of the above-cited solvents cannot satisfy some of the above-described conditions (1) to (3). Eventually, it is found that 1,1,1-trichloroethane alone can be used as solvent for the foregoing fluorine-containing polymers.

However, 1,1,1-trichloroethane has been lately considered a cause of destruction of the ozone layer in the atmosphere, and so the current practice is to place the use thereof under restriction from the standpoint of protecting the global environment.

Such being the case, efforts have been made to search for other solvents applicable to the foregoing fluorine-containing polymers and capable of substituting for 1,1,1-trichloroethane. However, such efforts have not yet produced satisfactory results.

On the other hand, we have made intensive studies on substitutes for the foregoing fluorine-containing polymers instead of those for the solvent. As a result, it has been found that acryl-silicone graft copolymers not only can exhibit excellent performance with respect to water repellency and an antisoiling property but also are favorable for resolving the above-described environmental problem because of their good solubility in organic solvents containing alcohols as a main component, thereby achieving the present invention.

SUMMARY OF THE INVENTION

Therefore, an object of the present invention is to provide an agent for fiber treatment which can give highly durable water repellency to materials treated therewith by a simple operation without having any bad influences on environments.

The above-described object is attained with a water repellent for fibers which comprises an acryl-silicone graft copolymer prepared by radical copolymerization reaction of an organopolysiloxane compound containing one radical polymerizable group with radical polymerizable monomers including an acrylate, a methacrylate or a mixture thereof as a main member.

DETAILED DESCRIPTION OF THE INVENTION

The acryl-silicone graft copolymer as the main ingredient of the present water repellent for fibers can be prepared by causing radical copolymerization between (1) an organopolysiloxane compound containing one radical polymerizable group and (2) radical polymerizable monomers including an acrylate, a methacrylate or a mixture thereof as a main member.

The organopolysiloxane compound (1) does not have any particular restriction, except that it must contain one radical polymerizable group, such as an acrylic group, a methacrylic group, a styryl group, a cinnamyl group, a vinyl group, an allyl group, etc. However, it is preferable for the organopolysiloxane compound to be a radical polymerizable silicone macromonomer represented by the following general formula (I), because such a macromonomer can readily copolymerize with radical polymerizable monomers and can be synthesized with ease:

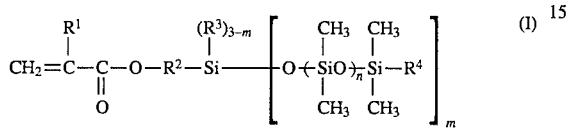

wherein $R^1$ represents a hydrogen atom or a methyl group, $R^2$ represents a divalent hydrocarbon group containing 1 to 12 carbon atoms and the carbon chain of which may be divided into some moieties by oxygen atoms, $R^3$ represents a methyl group or a trimethylsiloxy group, $R^4$ represents a monovalent hydrocarbon group containing 1 to 4 carbon atoms, n represents an integer of from 3 to 200, and m represents an integer of from 1 to 3.

Specific examples of $R^2$ include —$CH_2$—, —$(CH_2)_2$—, —$(CH_2)_3$—, —$CH_2CH(CH_3)CH_2$—, —$(CH_2)_6$—, —$(CH_2)_{12}$—, —$(CH_2)_2$—O—$(CH_2)_3$—, —$(CH_2)_2$—O—$(CH_2)_2$—O—$(CH_2)_3$—, and the like, and those of $R^4$ include —$CH_3$, —$CH_2CH_3$, —$CH_2CH_2CH_3$, —$CH_2CH_2CH_2CH_3$ and the like.

n represents an integer of from 3 to 200, preferably from 6 to 100. When n is smaller than 3, satisfactory water repellency cannot be achieved; while, when it is larger than 200, the resulting acryl-silicone graft copolymer is inferior in film forming ability, and so it fails to provide adequate durability.

The radical polymerizable silicone macromonomer of general formula (I) can be prepared from a (meth)acrylic group-substituted chlorosilane compound represented by the following general formula (II) and a hydroxy-terminated dimethylpolysiloxane compound represented by the following general formula (III) by causing a dehydrochlorination reaction therebetween in a conventional manner, or it can be prepared from the compound represented by general formula (II) and a Li-terminated dimethylpolysiloxane compound represented by the following general formula (IV) by causing a lithium chloride elimination reaction therebetween in a conventional manner:

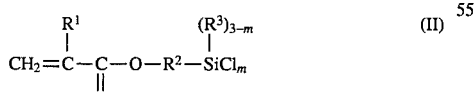

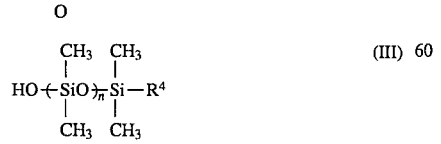

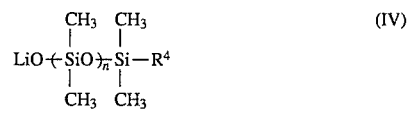

The preparation methods of the present silicone macromonomers, however, should not be construed as being limited to the above-recited ones.

Specific examples of the radical polymerizable silicone macromonomer of the foregoing general formula (I) are illustrated below.

Silicone Macromonomer (1):

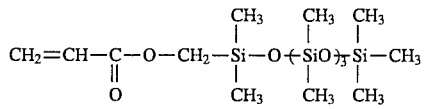

Silicone Macromonomer (2):

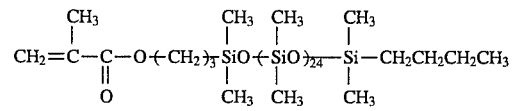

Silicone Macromonomer (3):

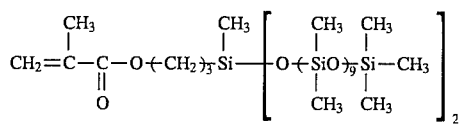

Silicone Macromonomer (4):

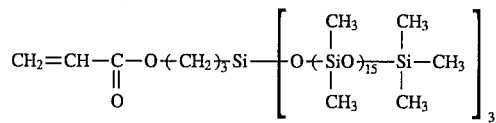

Silicone Macromonomer (5):

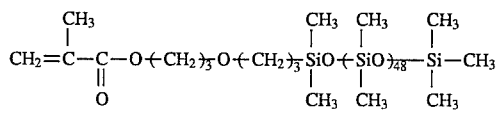

Silicone Macromonomer (6):

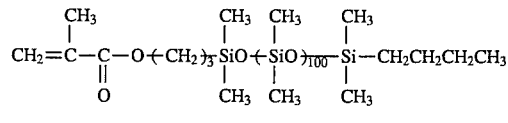

Silicone Macromonomer (7):

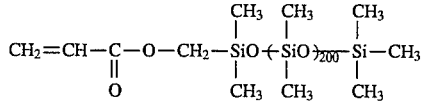

Silicone Macromonomer (8)

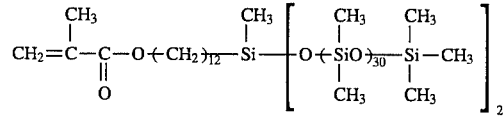

-continued

Silicone Macromonomer (9)

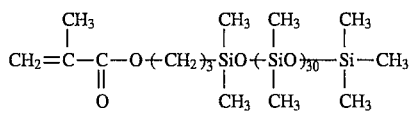

Silicone Macromonomer (10)

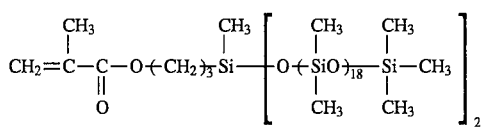

On the other hand, the term "acrylate and/or methacrylate (abbreviated to (meth) acrylate hereinafter)", which constitute the component (2), describes ester compound(s) of acrylic and/or methacrylic acid. Specific examples thereof include alkyl (meth) acrylates, such as methyl (meth)acrylate, ethyl (meth)acrylate, n-butyl (meth)acrylate, 2-ethylhexyl (meth)acrylate, etc.; hydroxyalkyl (meth) acrylates, such as 2-hydroxyethyl (meth)acrylate, 2-hydroxypropyl (meth)acrylate, 2-hydroxybutyl (meth) acrylate, etc.; fluorine-substituted alkyl (meth)acrylates, such as trifluoropropyl (meth) acrylate, perfluorobutylethyl (meth)acrylate, perfluorooctylethyl (meth) acrylate, etc.,; epoxy-containing (meth)acrylates, such as glycidyl (meth)acrylate, 3,4-epoxycyclohexylmethyl (meth)acrylate, etc.; and so on.

It is desirable that the proportion of (meth)acrylate be at least 50% by weight to the total of radical polymerizable monomers to copolymerize with the organopolysiloxane compounds as the component (1).

A reason for making such a limitation is as follows: When the proportion of (meth)acrylate is less than 50% by weight, the copolymer obtained tends to have insufficient film forming property and so the film formed by the treatment is sometimes deficient in durability.

Examples of radical polymerizable monomers, other than (meth) acrylate, which can be used in the present invention include (meth) acrylic acid; acrylamide; styrene and derivatives thereof; fumaric acid, maleic acid and derivatives thereof; radical polymerizable silicon compounds such as vinyltrimethoxysilane, τ-acryloxypropyltrimethoxysil ane, etc.; acrylonitrile; vinyl pyrrolidone; vinyl acetate; vinyl alkyl ethers; and radical polymerizable macromonomers such as polyoxyalkylenes containing one radical polymerizable group, polycaprolactones containing one radical polymerizable group, and so on.

In the present copolymerization, the ratio of the organopolysiloxane compound containing one radical polymerizable group (Component (1)) to the total of radical polymerizable monomers, including (meth)acrylate as a main member (Component (2)), or the Component (1)/Component (2) ratio, is in the range of desirably 5/95 to 80/20 by weight, more desirably 10/90 to 60/40 by weight.

When the component (1)/Component (2) ratio is less than 5/95 by weight, the resulting copolymer may not provide sufficient water repellency; while when the ratio is increased beyond 80/20 by weight, it may not have adequate film-forming property.

The copolymerization of the component (1), namely the organopolysiloxane compound containing one radical polymerizable group, and the component (2), namely the radical polymerizable monomers including (meth)acrylate as a main member, is carried out in the presence of a generally used radical polymerization initiator, including peroxides such as benzoyl peroxide, dicumyl peroxide, lauroyl peroxide, etc.; azo compounds such as 2,2'-azobis(2-methylbutyronitrile), etc.; and so on. Therein, any of a solution polymerization method, an emulsion polymerization method, a suspension polymerization method and a bulk polymerization method can be adopted.

Of these polymerization methods, a solution polymerization method is particularly preferred in the present invention because it is easy to control the molecular weight of the intended acryl-silicone graft copolymer to the optimal range.

Suitable examples of a solvent used in that method include aromatic hydrocarbons such as benzene, toluene, xylene, etc.; ketones such as acetone, methyl ethyl ketone, methyl isobutyl ketone, etc.; esters such as ethyl acetate, n-butyl acetate, isobutyl acetate, etc.; and alcohols such as ethanol, isopropanol, n-butanol, isobutanol, etc. These solvents maybe used alone or as a mixture of two or more thereof.

It is desirable to carry out the polymerization at a temperature of from 50° to 180° C., preferably from 60° to 120° C. If the polymerization is performed under such a temperature condition, it can be completed within a period of abut 5 to 10 hours.

As for the thus prepared acryl-silicone graft copolymer, it is desirable that the weight average molecular weight thereof measured by GPC (which stands for gel permeation chromatography) be in the range of 5,000 to 500,000, preferably 10,000 to100,000, reducedto a polystyrene basis. When the copolymer has a weight average molecular weight less than 5,000, it may be too poor in film forming ability to provide sufficient durability; while when the weight average molecular weight thereof is increased beyond 500,000 the textile treated therewith tends to have an unpleasant look and touch.

The thus prepared acryl-silicone graft copolymers can be made into a water repellent for textile by merely dissolving them in one or more of a solvent chosen from among the above-cited solvents, halogenated hydrocarbons such as trichloroethane, trichloroethylene, perchloroethylene, etc., aliphatic hydrocarbons such as n-hexane, cyclohexane, isooctane, etc.; or so on.

Also, the aqueous dispersion obtained by the emulsion polymerization or suspension polymerization, the aqueous dispersion obtained by the solution polymerization, or the emulsion of the copolymer obtained by the solution polymerization can be made into a water-base water repellent for textile as it is, or by dilution with water.

The concentration of the acryl-silicone copolymer as a main agent ranges preferably from 0.5 to 20% by weight, particularly preferably from 2 to 15% by weight. When the concentration is less than 0.5% by weight, sufficient repellency may not be obtained because too small an amount of the agent applied to the textile; while when it is greater than 20% by weight, the amount applied is too much, and so the resulting textile probably has an unpleasant look and touch and further may cause a whitening or powder-coated phenomenon.

The thus prepared water repellent composition which contains as a main agent the present acryl-silicone copolymer can confer satisfactory water repellency on natural or synthetic fibers, textile fabrics, paper sheets and so on merely by applying it to these materials in a usual manner, e.g., using a dip or spray coating method, and then drying. In particular, it is preferable to use the water repellent composition in the form of aerosol spray for the convenience of treatment.

When the present water repellent composition is prepared in the form of aerosol spray, it is desirable for the composition to consist of 0.5–20%, preferably 2–15%, by weight of the present acryl-silicone graft copolymer, 30–98.5% by weight of an organic solvent containing alcohols as the main component and 1–50%, preferably 2.5–40%, by weight of a jet gas.

As for the alcohols contained as the main component in the foregoing organic solvent, monohydric alcohols, such as ethanol, isopropyl alcohol and the like, and dihydric alcohols, such as ethylene glycol, propylene glycol and the like, are examples thereof. In particular, it is advantageous to use ethanol or isopropyl alcohol.

In the foregoing composition, the proportion of alcohols for the whole organic solvent is preferably at least 80 wt %.

Specific examples of other solvents which may be mixed with alcohols include aromatic hydrocarbons, such as toluene, xylene, etc.; aliphatichydrocarbons, such as n-hexane, n-heptane, etc.; esters, such as ethyl acetate, etc.; ketones, such as acetone, methyl ethyl ketone, etc.; chlorinated hydrocarbons, such as methylene chloride, etc.; and alicyclichydrocarbons, such as cyclohexane, etc. These solvents may be used alone or as a mixture of two or more thereof.

When the water repellent composition comprises less than 30% by weight of an organic solvent containing alcohols as the main component, it may have a disadvantage in causing a powder-coated or whitening phenomenon; while when it comprises more than 98.5% by weight of the organic solvent, it tends to suffer from disadvantages such that it can hardly be used in the form of aerosol because of difficulty in atomization thereof and the water repellency provided thereby is not adequate.

The jet gas is a component necessary for atomizing the water-repellent composition of the present invention, and can be properly chosen from conventionally used ones. More specifically, propane, butane, dimethyl ether, carbonic acid gas and nitrogen gas can be used alone or as a mixture of two or more thereof depending on the spraying condition and the requisite gas pressure.

The amount of a jet gas depends greatly on the kind of the gas used, and so a sweeping limitation cannot be put thereon. In general, however, it can be said that when the proportion of a jet gas is less than 1% by weight the resulting composition may not be made into aerosol, while when it is increased beyond 50% by weight the resulting composition tends to have a disadvantage in causing a power-coated or whitening phenomenon.

In accordance with the present invention, the agent for fiber treatment is an acryl-silicone graft copolymer, and this copolymer enables the use of alcohols as a solvent for the fiber-treatment composition. Therefore, the present composition has no bad influences on the environment when it is used in the form of atomized spray, and can provide highly durable water repellency.

Now, the present invention will be illustrated in more detail by reference to the following examples. However, the invention should not be construed as being limited to those examples.

To begin with, acryl-silicone graft copolymers used in the following examples were synthesized as follows.

SYNTHESIS EXAMPLE 1

A one-liter glass flask equipped with a stirrer, a condenser and a thermometer was charged with 300 g of toluene. Thereinto, a mixture of 90 g of a radical polymerizable silicone macromonomer having the chemical formula illustrated below, 150 g of methylmethacrylate, 60 g of butylmethacrylate and 6 g of 2,2'-azobisisobutyronitrile was dripped over a period of 2 hours as nitrogen gas was admitted thereinto and the temperature of the reaction system was kept at 80°–90° C.

Further, the reactants described above underwent 5 hours' polymerization reaction at 80°–90° C., and then cooled to room temperature. The resulting reaction mixture was poured into 3 liter of methanol to form a precipitate of the intended acryl-silicone graft copolymer.

The precipitate was dried at 120° C. under reduced pressure of 5 mmHg. Thus, 271 g of a colorless transparent solid was obtained. The weight average molecular weight thereof determined by GPC was about 65,000, reduced to a polystyrene basis.

Silicone Macromonomer

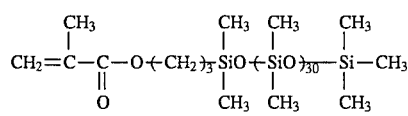

SYNTHESIS EXAMPLE 2

The other acryl-silicone graft copolymer was synthesized in the same manner as in Synthesis Example 1, except that 150 g of a radical polymerizable silicone macromonomer having the chemical formula illustrated below was used in place of the radical polymerizable silicone macromonomer used in synthesis example 1, the amount of methylmethacrylate was changed to105 g and 45 g of 2-ethylhexylacrylate was used in place of the butylmethacrylate. Thus, 282 g of a colorless transparent solid was obtained. The weight average molecular weight thereof determined by GPC was about 58,000, reduced to a polystyrene basis.

Silicone Macromonomer

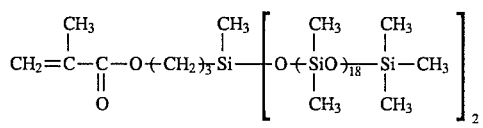

EXAMPLE 1

Two parts by weight of the acryl-silicone graft copolymer obtained in Synthesis Example 1 was dissolved in 98 parts by weight of isopropanol to prepare a water repellent composition.

In the water repellent composition, textile fabrics of polyester taffeta, nylon taffeta and cotton broadcloth were dipped, and then they were taken out and excess water repellent was removed therefrom. After 2 minutes' drying at 80° C., the foregoing textile fabrics each underwent a spray water repellency test (according to JISL-1092-1986). The results obtained are shown in Table 1.

Water Repellency Test

There was examined to what extent each fabric got wet in spraying water onto the front surface of the cloth. Therein, the water repellency was evaluated according to a criterion described below:

1) when a fabric was wet all over on not only the front side but also the back side, the water repellency was evaluated as 0, 2) when a fabric was wet all over on the front side alone, the water repellency was evaluated as 50, 3) When the front surface of a fabric was wet in half of its area and fine waterdrops infiltrated scatteringly into the fabric, the water repellency was evaluated as 70, 4) When the front surface of a fabric was wet with fine waterdrops scattered all over, the water repellency was evaluated as 80, 5) When the front surface of a fabric was not wet but fine waterdrops adhered thereto, the water repellency was evaluated as 90, and 6) when the front surface of a fabric neither got wet at all nor had waterdrops adhering thereto, the water repellency was evaluated as 100.

EXAMPLE 2

Another water repellent composition was prepared in the same manner as in Example 1, except that the acryl-silicone graft copolymer obtained in Synthesis Example 2 was used in place of the acryl-silicone graft copolymer used in Example 1. This water repellent composition was subjected to the same water repellency test as in Example 1. The results obtained are shown in Table 1.

COMPARATIVE EXAMPLE 1

A solution consisting of 3 parts by weight of methylhydrogenpolysiloxane having the following chemical formula, 2 parts by weight of zinc octanoate and 95 parts by weight of toluene was subjected to the same water repellency test as in Example 1. The results obtained are shown in Table 1.

TABLE 1

Water Repellency Evaluation $$CH_3-\underset{\underset{CH_3}{|}}{\overset{\overset{CH_3}{|}}{Si}}-O-\left(\underset{\underset{CH_3}{|}}{\overset{\overset{H}{|}}{Si}}-O\right)_{30}-\underset{\underset{CH_3}{|}}{\overset{\overset{CH_3}{|}}{Si}}-CH_3$$

| | Polyester Taffeta | Nylon Taffeta | Cotton Broadcloth |
|---|---|---|---|
| Example 1 | 100 | 100 | 100 |
| Example 2 | 100 | 100 | 100 |
| Comparative Example 1 | 80 | 70 | 80 |

The data set forth above demonstrate that the water repellent compositions prepared in accordance with the present invention are significantly superior in water repellency to conventional ones.

EXAMPLE 3

The water repellent-treated polyester taffeta obtained in Example 1 was examined for durability of its water repellency according to the procedure described below:

Durability Test of Water Repellency

The treated fabric was put in the washing bath of an electric washing machine for domestic use, to which sodium alkylbenzenesulfonate and sodium carbonate were added in proportions of 5 g and 2 g, respectively, for 1 liter of water, and washed for 15 minutes under a washing water temperature of 50° C. Therein, the bath ratio, or the ratio of the weight (Kg) of the fabric washed to the volume (l) of the washing water used, was 1:100. After thorough rinsing and drying, the resulting cloth was subjected to the same spray water repellency test as described above. This procedure was carried out again and again.

The results obtained are shown in Table 2.

EXAMPLE 4

Polyester taffeta was dipped in the water repellent composition prepared in Example 1, and then taken out thereof. After removal of excess water repellent, the resulting taffeta was dried at room temperature for 5 hours. Then, it was examined for durability of its water repellency by repeating the same washing procedure as in Example 3. Thus, the results shown in Table 2 are obtained.

EXAMPLE 5

The water repellent-treated polyester taffeta obtained in Example 2 was examined for durability of its water repellency according to the same procedure as carried out in Example 3. Thus, the results shown in Table 2 are obtained.

EXAMPLE 6

Polyester taffeta was treated in the same manner as in Example 4, except that the water repellent composition prepared in Example 2 was used in place of that prepared in Example 1, and examined for durability of its water repellency according to the same procedure as in Example 4. Thus, the results shown in Table 2 are obtained.

COMPARATIVE EXAMPLE 2

Polyester taffeta was dipped in the same water repellent composition as prepared in Comparative Example 1, and taken out thereof. After removal of excess water repellent, the resulting taffeta was subjected to a heat treatment at 150° C. for 2 minutes, and then examined for durability of its water repellency according to the same procedure as carried out in Example 3. Thus, the results shown in Table 2 are obtained.

TABLE 2

| | Number of Times Washing Procedure was Repeated | | | | | |
|---|---|---|---|---|---|---|
| | 0 | 1 | 2 | 3 | 4 | 6 |
| Example 3 | 100 | 100 | 100 | 100 | 100 | 100 |
| Example 4 | 100 | 100 | 100 | 100 | 100 | 100 |
| Example 5 | 100 | 100 | 100 | 100 | 100 | 100 |
| Example 6 | 100 | 100 | 100 | 100 | 100 | 100 |
| Comparative Example 2 | 100 | 80 | 70 | 50 | 50 | 50 |

The data set forth above demonstrate that the water repellents prepared in accordance with the present invention are decidedly superior in durability of water repellency to conventional ones.

EXAMPLES 7 TO 12 AND COMPARATIVE EXAMPLES 3 TO 5

Aerosol-form water repellents were prepared using components (I), (II) and (III) in various mixing proportions (% by weight) set forth in Table 3 according to a conventional manner.

Each of the water repellents was uniformly sprayed in the form of aerosol onto a black cloth of cuprammonium rayon from a distance of 20 cm, and examined by visual observation as to whether or not a powder-coated or whitening phenomenon occurred just after spraying, and further as to whether or not such a phenomenon was caused after air drying. The results judged by a criterion described below are shown in Table 3.

TABLE 3

|  | Examples | | | | | | Comparative Examples | | |
| --- | --- | --- | --- | --- | --- | --- | --- | --- | --- |
|  | 7 | 8 | 9 | 10 | 11 | 12 | 3 | 4 | 5 |
| Component (I) | | | | | | | | | |
| Copolymer prepared in Synthesis Example 2 | 8.4 | 15 | 8.4 | 8.4 | 8.4 | 8.4 | 0.2 | 25 | 8.4 |
| Component (II) | | | | | | | | | |
| Ethanol | 61 | 50 | 55 | 55 | 55 | 61 | 74.8 | 33.3 | 31 |
| Isopropyl alcohol | 5.6 | 10 | 11.6 | 5.6 | 5.6 | 5.6 | — | 16.7 | 5.6 |
| Methyl ethyl ketone | — | — | — | 6 | — | — | — | — | — |
| n-Hexane | — | — | — | — | 6 | — | — | — | — |
| Component (III) | | | | | | | | | |
| Dimethyl ether | 25 | 25 | 25 | 25 | 25 | 20 | 25 | 25 | 55 |
| Carbonic acid gas | | | | | | 5 | | | |
| Water Repellency Aerosol Spraying Performance | 100 | 100 | 100 | 100 | 100 | 100 | 0–50 | 100 | 100 |
| Powder-coated Phenomenon | O | O ~Δ | O | O ~Δ | O ~Δ | O | O | X | Δ ~X |
| Whitening Phenomenon | O | O ~Δ | O | O ~Δ | O ~Δ | O | O | X | Δ ~X |

O: The treated cloth is in the same surface condition as the untreated cloth has (No whitening phenomenon).
Δ: The surface of the treated cloth is somewhat whitened, compared with the untreated cloth.
X: An appreciable whitening phenomenon is observed at the surface of the treated cloth.

It is ascertained from the data set forth above that the present water repellent can have excellent performance in the form of aerosol when the proportions of the components are in their respective desirable ranges described hereinbefore.

What is claimed is:

1. An acryl-silicone copolymer prepared by the radical copolymerization reaction of an organopolysiloxane compound containing one radical polymerizable group of the formula

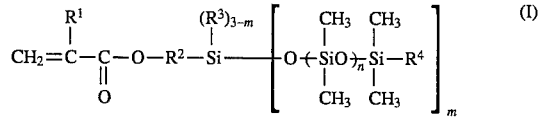

wherein $R^1$ is a hydrogen atom or a methyl group, $R^2$ is a divalent hydrocarbon group containing 1 to 12 carbon atoms the carbon chain of which optionally contains oxygen atoms to provide ether groups, $R^3$ is a methyl group or a trimethyl siloxy group, $R^4$ is a monovalent hydrocarbon group containing 1 to 4 carbon atoms, n is an integer of 3–200, and m is an integer of 1–3, with radical polymerizable monomers including an acrylate, a methacrylate or a mixture thereof as a main member, wherein 30–80% by weight of the copolymer is formed from the organopolysiloxane compound and 20–70% by weight of the copolymer is formed from the radical polymerizable monomers, with the proviso that the radical polymerizable monomers do not include methacrylic acid.

2. A copolymer according to claim 1, wherein the radical polymerizable monomers comprise at least 50% by weight of acrylate, methacrylate or a mixture thereof.

3. A copolymer according to claim 2, wherein at least one acrylate or methacrylate is an alkyl acrylate or methacrylate, a hydroxyalkyl acrylate or methacrylate, a fluoroalkyl acrylate or methacrylate or an epoxy-containing acrylate or methacrylate.

4. A compolymer according to claim 1, wherein the graft copolymer has a weight average molecular weight ranging from 5,000 to 500,000, reduced to a polystyrene basis.

5. A water repellent composition for fibers, containing the acryl-silicone graft copolymer defined by claim 1 in an organic solvent in a concentration of 0.5 to 20% by weight.

6. A water repellent composition according to claim 5, wherein the solvent is at least one solvent chosen from the group consisting of aromatic hydrocarbons, ketones, esters, alcohols and aliphatic hydrocarbons.

7. A water-base water repellent composition for fibers, containing in water the acryl-silicone copolymer defined by claim 1 in a concentration ranging from 0.5 to 20% by weight.

8. An aerosol-form water repellent for fibers, comprising the acryl-silicone copolymer defined by claim 1 in a proportion ranging from 0.5 to 20% by weight, an organic solvent in a proportion ranging from 30 to 98.5% by weight and a jet gas in a proportion ranging from 1 to 50% by weight.

9. An aerosol-form water repellent according to claim 8, wherein the organic solvent contains at least 80% by weight of an alcohol.

10. An aerosol-form water repellent according to claim 9, wherein the alcohol is ethanol, isopropanol or a mixture thereof.

11. An aerosol-form water repellent according to claim 8, wherein the jet gas is at least one gas chosen from the group consisting of propane, butane, dimethyl ether, carbonic acid gas and nitrogen gas.

12. The copolymer of claim 4, wherein n is from 6 to 100.

13. The copolymer of claim 1, wherein the weight ratio of the organopolysiloxane compound to the radical polymerizable monomers is from 30:70 to 80:20.

14. The copolymer of claim 1, wherein the radical copolymerization reaction is conducted in the presence of a peroxide or azo compound radical polymerization initiator by a solution polymerization method, emulsion polymerization method, suspension polymerization method or bulk polymerization method.

15. The copolymer of claim 1, wherein the weight ratio of the organopolysiloxane compound to the radical polymerizable monomers is 50:50 to 80:20.

16. The copolymer of claim 1, wherein the copolymer has a weight average molecular weight of 10,000 to 100,000, reduced to a polystyrene basis.

17. A water repellent composition for fibers comprising an acryl-silicone copolymer prepared by the radical copolymerization reaction of an organopolysiloxane compound containing one radical polymerizable group of the formula

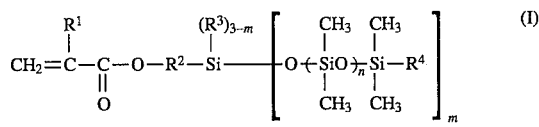

wherein $R^1$ is a hydrogen atom or a methyl group, $R^2$ is a divalent hydrocarbon group containing 1 to 12 carbon atoms the carbon chain of which optionally contains oxygen atoms to provide ether groups, $R^3$ is a methyl group or a trimethyl siloxy group, $R^4$ is a monovalent hydrocarbon group containing 1 to 4 carbon atoms, n is an integer of 3–200, and m is an integer of 1–3, with radical polymerizable monomers including an acrylate, a methacrylate or a mixture thereof as a main member, wherein 30–80% of the copolymer is formed from the organopolysiloxane compound and 20 to 70% of the copolymer is formed from the radical polymerizable monomers, and wherein the composition is capable of providing a water repellent coating on a fiber.

18. An acryl-silicone copolymer prepared by the radical copolymerization reaction of an organopolysiloxane compound containing one radical polymerizable group of the formula

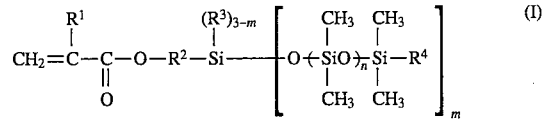

wherein $R^1$ is a hydrogen atom or a methyl group, $R^2$ is a divalent hydrocarbon group containing 1 to 12 carbon atoms the carbon chain of which optionally contains oxygen atoms to provide ether groups, $R^3$ is a methyl group or a trimethyl siloxy group $R^4$ is a monovalent hydrocarbon group containing 1 to 4 carbon atoms, n is an integer of 3–200, and m is an integer of 1–3, with radical polymerizable monomers including an acrylate, a methacrylate or a mixture thereof as a main member, wherein 50–80% by weight of the copolymer is formed from the organopolysiloxane compound and 20–50% by weight of the copolymer is formed from the radical polymerizable monomers.

* * * * *